(12) United States Patent
Elleaume (10) Patent No.: US 7,907,086 B2
(45) Date of Patent: Mar. 15, 2011

(54) GENERIC RADAR ARCHITECTURE

(75) Inventor: Philippe Elleaume, Verrieres le Buisson (FR)

(73) Assignee: Thales (FR)

( * ) Notice: Subject to any disclaimer, the term of this patent is extended or adjusted under 35 U.S.C. 154(b) by 245 days.

(21) Appl. No.: 11/917,152

(22) PCT Filed: Jun. 9, 2006

(86) PCT No.: PCT/EP2006/063059
§ 371 (c)(1),
(2), (4) Date: May 4, 2009

(87) PCT Pub. No.: WO2006/131561
PCT Pub. Date: Dec. 14, 2006

(65) Prior Publication Data
US 2010/0045511 A1 Feb. 25, 2010

(30) Foreign Application Priority Data

Jun. 10, 2005 (FR) ..................................... 05 05927

(51) Int. Cl.
*G01S 13/00* (2006.01)
(52) U.S. Cl. ........................................ 342/175; 342/189
(58) Field of Classification Search .................. 342/175, 342/189
See application file for complete search history.

(56) References Cited

U.S. PATENT DOCUMENTS

| | | | |
|---|---|---|---|
| 6,285,316 B1* | 9/2001 | Nir et al. .................. | 342/357.46 |
| 6,373,834 B1* | 4/2002 | Lundh et al. .................. | 370/350 |
| 6,677,892 B1* | 1/2004 | Elleaume ..................... | 342/194 |
| 6,882,634 B2* | 4/2005 | Bagchi et al. ................. | 370/338 |
| 6,947,427 B1* | 9/2005 | Rokugo et al. ............. | 370/395.5 |
| 2002/0027886 A1* | 3/2002 | Fischer et al. ................ | 370/255 |
| 2006/0041631 A1 | 2/2006 | Kadowaki | |
| 2007/0076650 A1* | 4/2007 | Manjeshwar et al. ........ | 370/328 |
| 2010/0045511 A1* | 2/2010 | Elleaume ..................... | 342/175 |

OTHER PUBLICATIONS

Sivirikaya F et al: "Time Synchronization in Sensor Networks: A Survey"; IEEE Network, IEEE Service Center, New York, NY, US, vol. 18, No. 4, (Jul. 2004), pp. 45-50, XP001220892; ISSN: 0890-8044.

* cited by examiner

*Primary Examiner* — John B Sotomayor
(74) *Attorney, Agent, or Firm* — Lowe Hauptman Ham & Berner, LLP (57) ABSTRACT

The invention relates to the general field of complex electronic and/or computerized system architectures for which the interchanges take the form of irregular data flows prompted by processing functions of variable duration in time. The object of the invention is an architecture designed for electronic systems having a plurality of processing nodes in which each node provides a function or part of a function implemented by the system. This architecture is based on one single synchronization link which supplies all the modules with a common synchronization message containing synchronization information and a simplified header. There are a plurality of asynchronous data interchange links. Each link allows a message interchange between two specific processing nodes, with the interchanged messages having data to be processed, accompanied by a generic header. The asynchronous links' generic header includes all the information relating to the system's operating step to which the interchanged data refer. The synchronous link's simplified header makes it possible to determine the data stream to which the associated synchronization information applies. Each processing node has means suitable for interfacing with the synchronous and asynchronous links. The invention applies particularly to the design of electromagnetic or acoustic sensors, such as radars and sonars.

19 Claims, 8 Drawing Sheets

GENERIC RADAR ARCHITECTURE

CROSS-REFERENCE TO RELATED APPLICATIONS

The present Application is based on International Application No. PCT/EP2006/063059, filed on Jun. 9, 2006, which in turn corresponds to French Application No. 05 05927, filed Jun. 10, 2005, and priority is hereby claimed under 35 USC §119 based on these applications. Each of these applications are hereby incorporated by reference in their entirety into the present application.

FIELD OF THE INVENTION

The invention relates to the general field of complex electronic and/or computerized system architectures and particularly to the field of structures for the interchange of information between the various elements of such architectures. Quite particularly, it concerns complex systems for which the interchanges take the form of irregular data flows prompted by processing functions of variable duration in time.

It applies particularly to the design of electromagnetic or acoustic sensors, such as radars and sonars.

BACKGROUND OF THE INVENTION

Current designers of electromagnetic or acoustic sensors are confronted by new problems related particularly to the great complexity of functions provided by the processing subassemblies that make up these systems. The complexity of these functions is as much due to the complexity of the operations implemented as to the great variation in the quantities of information (flows of information) processed from one operating phase of the system to another. Thus, one and the same function may have to process either a large-sized data stream or a very small-sized data stream. It may even have to process variable alternations of long data streams and short data streams. This implies, in particular, that for one and the same function the processing time can vary widely, this variability consequently giving rise to a degree of irregularity over the course of time in the data flows transmitted from one autonomous functional unit, or processing node, to another. Furthermore, the functions provided are more and more elaborate and entail computation loads of increasing size and sequencing operations of increasing complexity.

This present and especially future growth in desired performance levels is not very tolerant of conventional architectures around which current systems are designed, in particular. These architectures are generally based on the development of synchronous machines performing tasks which are admittedly autonomous but for which all of the sequencing is ensured by means of signals delivered by a specific processing node whose interchanges are tightly synchronized. Thus, the irregularity of the data flows makes developing such a processing node very difficult.

The effect of such architectures is to divide up systems designed in this manner into collections of subassemblies performing processing tasks, each subassembly being timed by a dedicated set of synchronization signals, provided by a subassembly, which is responsible for generating the various synchronization signals. They thus hinder a more integrated design step in which the system is considered as a whole to be a single multifunctional machine.

This dividing-up associated with excessive synchronism in the interchanges results in the system produced being limited in its processing capacity, in terms of the quantity of information processed. This limitation, which is directly attributable to the architecture adopted, hampers the necessary growth in the computation capacity of the systems, a growth that the processing nodes making up the subassemblies would, moreover, be capable of withstanding separately.

This limitation makes conventional architectures difficult to adopt for future systems for which the level of performance is directly related to the computation capacity and to the ability to adapt to variations in the data flows.

Another drawback of current architectures is related to the organization of the sequencing of the various processing nodes around a general sequencer which is responsible for overall synchronization and which supplies each of the other processing nodes with all of the synchronization signals which it requires. This centralized production of the synchronization signals is put into practice by the presence of a very large number of physical links in high-level systems, which makes the production and refinement of such systems tricky, and hampers their capacity for development.

SUMMARY OF THE INVENTION

One of the aims of the invention is to allow a system having a plurality of subassemblies to make optimum use of the computation capacities of each of the processing nodes forming them, taking account of the fact that, in a given string of tasks, each processing node is prompted to perform the task or tasks for which it is responsible at a rate which may vary over time, on the basis of the variations in the flow of the processed data in particular.

Another aim is to allow systems to be designed which can develop, a system being able to incorporate processing subassemblies and/or nodes in the course of its life whose computation capacity will have developed such that the processing capacity of the system as a whole can increase.

Yet another aim is to facilitate the production, servicing and maintenance of systems which are more and more complex, particularly by limiting the type and number of physical links.

To this end, the object of the invention is an electronic system architecture, particularly a radar detection system architecture, having a plurality of processing nodes in which each node provides a function or part of a function implemented by the system. This architecture is characterized by:
  a single synchronization link which supplies all the modules with a common synchronization message which has a simplified header, a synchronization signal, a common base clock and reference date, the simplified header making it possible to determine the data stream to which the synchronization information applies,
  a plurality of asynchronous data interchange links, each link allowing the interchange of specific messages between two specific processing nodes, the interchanged messages having data to be processed, accompanied by a common generic header containing all the information which is used by the various processing nodes in the system and which relates to the system's operating step to which the interchanged data refer. This header allows each processing node to associate the data held in a message with a determined phase in the system's operation and to determine the way in which these data need to be processed.

According to the invention, the simplified header, which the synchronization message contains, is part of the generic header of the messages transmitted by the asynchronous links, which corresponds to the same operating step in the system.

According to the invention, each processing node has means suitable for interfacing with the synchronization link and for implementing its internal sequencing on the basis of the general synchronization message. Each processing node likewise has means suitable for associating the data transmitted by a data interchange link with the appropriate header.

According to the invention, the synchronization link transmits a timing clock H, a synchronization signal and binary data frames, the synchronization signal and the binary data which make up the frames being transmitted by modulating the form factor of the clock H, with the modulation preserving the time interval separates the rising edges of the clock H.

According to one feature of the invention, the modulation of the form factor of the clock H comprises 3 states:
- a 0 state for which the high state of the clock H has a duration equal to that of the low state, the form factor being equal to ½,
- a 1 state for which the high state of the clock H has a duration greater than that of the low state, the form factor being greater than ½,
- a −1 state for which the high state of the clock H has a duration less than that of the low state, the form factor being less than ½.

The values of the binary data in the frames are moreover encoded on the two states 0 and 1, with the synchronization signal being identified by the −1 code.

According to another feature of the invention, the transmission of a data frame on the synchronization link is signaled by the transmission of a synchronization signal. The transmission of a frame corresponds generally to the start of execution of an operational task by the system. Within the context of a radar system, an example of an operational task may be a burst.

According to the invention, each processing node synchronizes its slow clocks, whose frequency is a submultiple of the clock frequency H, using the synchronization signal.

According to a preferred form of implementation of the invention, the synchronization signal is emitted periodically, accompanied by a data frame containing useful synchronization information or a dummy frame containing meaningless data.

According to this preferred form of implementation, each frame transmitted has a bit field indicating whether this frame is a real frame or whether it is a dummy frame.

According to one implementation variant of the invention, the synchronization signal is transmitted on the synchronization link in the form of a sequence made up of a succession of bits which can take the values 0, 1 or −1, the structure of the sequence being defined such that the synchronization signal can be recognized by the subassemblies using a ternary correlator by detecting a correlation peak.

According to another implementation variant, the information held in the binary frame is subjected to encoding using a code, which detects and corrects errors.

This decentralized architecture advantageously allows the asynchronous operation of the various processing subassemblies and nodes to be strengthened. Each interchange of data between two processing nodes is implemented by an asynchronous link, without intervention by validation or synchronization signals.

This architecture also allows each processing node to adapt to variations in the flow of the interchanged data.

The system is thus considered as a whole to be a single logical machine whose computation capacity is much higher than that obtained by operating the same processing nodes with a conventional synchronous architecture. Moreover, the architecture based on the invention likewise allows the tasks performed by the system to be divided into functions, with one and the same function being able to implement computation nodes distributed over various physical entities such as printed circuits. Division into functions is thus advantageously independent of the physical division of the system.

The architecture based on the invention also makes it possible to take advantage of the growth of the computation capacities from which a module can benefit following a new design. It also makes it possible to implement functions which are additional to the system, in the course of its lifetime, without this implementation requiring any great modification of the system's existing structure.

The setup of a single synchronization link also has the advantage of limiting the number of physical links to be implemented. It allows every processing subassembly or node to autonomously synchronize its own clocks on the basis of a timing clock H associated with a synchronization signal.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention.

Accordingly, the drawings and description thereof are to be regarded as illustrative in nature, and not as restrictive.

DETAILED DESCRIPTION OF THE DRAWINGS

Figure 1:
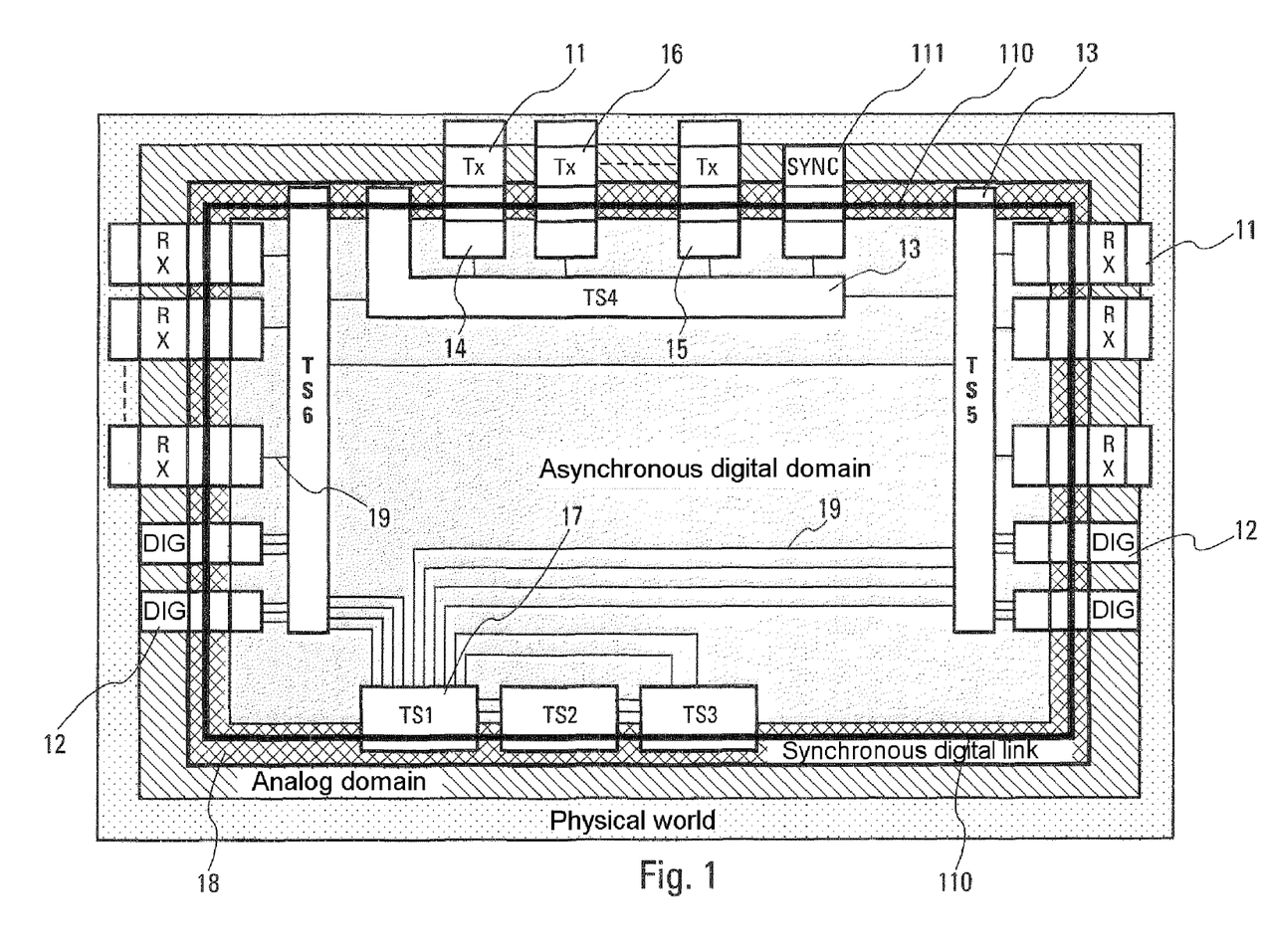
FIG. 1: shows a schematic illustration of the architecture based on the invention.

Consideration will first of all be given to FIG. 1. This figure allows presentation of the general features of the architecture based on the invention. It uses a functional diagram to show all the functions, which may be covered by a complex electronic system, such as a radar. Such a system may have a first family of subassemblies 11 performing interface functions with an external environment, which environment may be the atmosphere, for example, in the case of an electromagnetic sensor such as a radar, but may also be the marine environment for an acoustic sensor of sonar type, or even any specific interface of physical sensor type. In the specific case of a radar system, the subassemblies 11 are the subassemblies responsible for the hyperfrequency transmission and reception, for example.

Such a system may also have a certain number of subassemblies 12 with an analog role, one of whose functions may be to digitize the signals interchanged by the subassemblies 11 with the outside environment, for example.

Finally, such a system may have digital subassemblies 13, such as microprocessors or microcontrollers, whose functions are essentially the synchronous or asynchronous processing of data.

On the matter of complex systems, it can easily be seen that, although it belongs as a whole to one or other domain, a subassembly may itself have elements belonging to other domains. Thus, by way of example, it can easily be seen that a subassembly 11 whose main function is to act as an interface to the physical world (atmosphere or marine environment, for example) has elements 14-15, allowing it to interchange digital data, synchronously or asynchronously, with a processing node such as a microprocessor. Equally, it can easily be seen that such a subassembly has essentially analog elements 16 which allow it to transmit the signals received from the outside environment to a subassembly 12 responsible for digitizing them.

The structure of the links between analog machines generally meets constraints and defined standards, which are dependent, in particular, on the nature of the analog signals interchanged. Specific standardization of such links is therefore not useful, in principle.

On the other hand, as far as the standardization of digital data interchanges is concerned, the benefit provided by such standardization can prove to be very great.

It is for this reason that the architecture based on the invention has the main object of defining the mode of operation of the digital elements included in the various subassemblies making up a complex system, and of standardizing the digital data interchanges between these elements. It therefore mainly concerns the synchronous 17 and asynchronous 18 digital domains.

In the description that follows, a processing node will refer to a functional entity, which is part of a subassembly, and capable of autonomously and intelligently implementing a determined, synchronous or asynchronous, task on the basis of parameters supplied to it. These processing nodes are the functional entities to which the architecture based on the invention applies. A given functional unit may have one or more processing nodes, depending on the function it provides. The processing nodes, which interact to provide a given function may, moreover, be situated on separate physical entities, printed circuits or racks, for example, Regardless of their restrictive physical setups, the interchange of data between two processing nodes is always assured by means of an asynchronous link bus. Likewise, each processing node is connected to the synchronization link.

As shown in FIG. 1, the architecture according to the invention is mainly based on subassemblies, particularly digital ones, having one or more asynchronous processing nodes interchanging data asynchronously with other processing nodes.

However, since, in spite of everything, some processing nodes need to have a precise chronometry for some of the tasks which they perform, they likewise have synchronous processing nodes.

One and the same subassembly may, furthermore, have some synchronous processing nodes and some other asynchronous processing nodes.

It is thus possible to distinguish the architecture in terms of the nature of the interfaces included in a subassembly designed for this architecture, allowing the various processing nodes contained in this subassembly to process and interchange data, and in terms of the nature of the links allowing the data interchanges between processing nodes.

A system designed around the architecture based on the invention thus has a plurality of links for interchanging asynchronous data 19 and one synchronization link 110.

According to the invention, the asynchronous links 19 are essentially links of "point-to-point" type, with a link allowing a processing node which belongs to a given subassembly to interchange information with other processing nodes which belong to the same subassembly or to a different subassembly. The synchronization link 110, for its part, is a single link allowing a subassembly 111 which manages the global synchronization of the system to send a general synchronization message to all the processing nodes.

Figure 2:
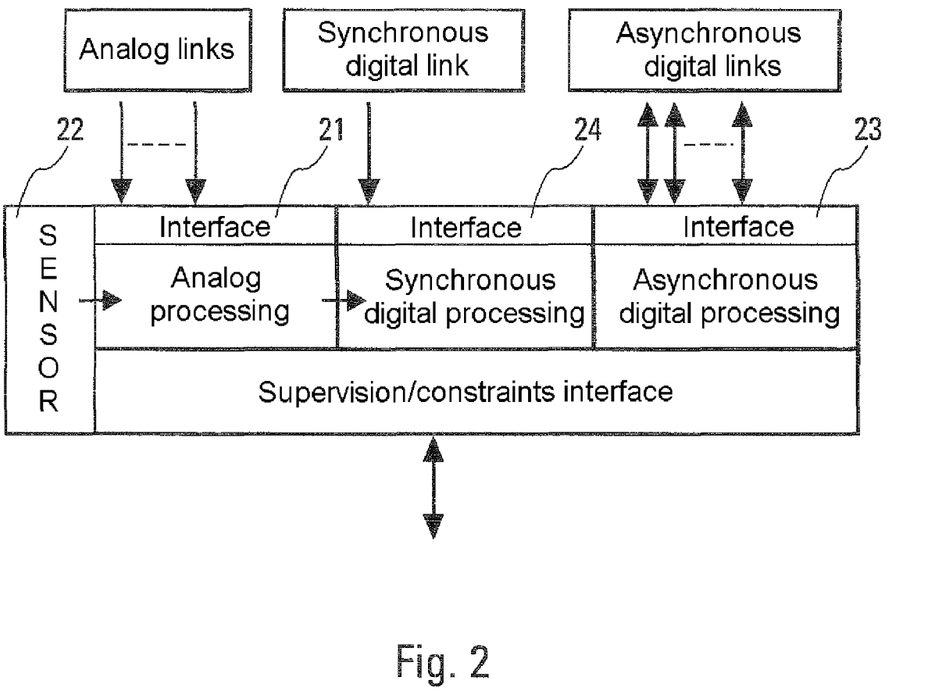
FIG. 2: shows a schematic view of the interfacing structure of a processing node developed in accordance with the architecture based on the invention.

Consideration is now given to FIG. 2, which shows, in a very general way, the structure of the interfaces fitting a subassembly designed for the architecture based on the invention. The illustration in FIG. 2 corresponds to a typical subassembly, providing functions relating to the various information interchange domains mentioned previously. It is naturally possible to imagine that, because of the tasks it performs, a given subassembly does comprise no interface 21 to the analog domain or else no interface 22 to the outside environment. In this case, it will not comprise analog interface, or sensor. On the other hand, generalizing interchanges of information or of signals in digital form makes the presence of digital interfaces necessary, whatever the global function performed by the subassembly.

One important feature of the invention is allowing standardization of the interchanges and of ensuring that each subassembly has internal operation as independent as possible of that of the other subassemblies. To this end, a subassembly designed for the architecture based on the invention comprises one (or more) asynchronous digital interfaces 23 which allow it to make use of the data transmitted to it by another subassembly and to condition the data it transmits to another subassembly. It also comprises a synchronous digital interface 24 allowing it to provide independent internal sequencing which, if the task to executed so requires, can refer to global chronometry in the system.

The rest of the document relates more particularly to these digital links and to the corresponding interfaces.

As has been said previously, the architecture based on the invention implements firstly asynchronous links allowing data to be interchanged between subassemblies, and secondly a synchronization link. The synchronization link simultaneously connects all the system's subassemblies to which it supplies a synchronization message, a base clock H, a synchronization signal and a date reference. The synchronization link also provides a simplified header allowing a processing node performing synchronous processing to associate the received synchronization message with a specific asynchronous data item, which is itself characterized by the header (label) of the message in which it is included. According to the invention, the simplified header transmitted in the synchronization message is part of the header which accompanies the corresponding asynchronous data item.

According to the processing node under consideration, this node uses all or part of this information.

The synchronization link is a multirecipient unidirectional link, operating in broadcast mode, on which the synchronization messages are transmitted by the specific subassembly 111 to the processing nodes of the other subassemblies. The technical features of the synchronization link based on the invention are described in the next part of the document.

Figure 3:
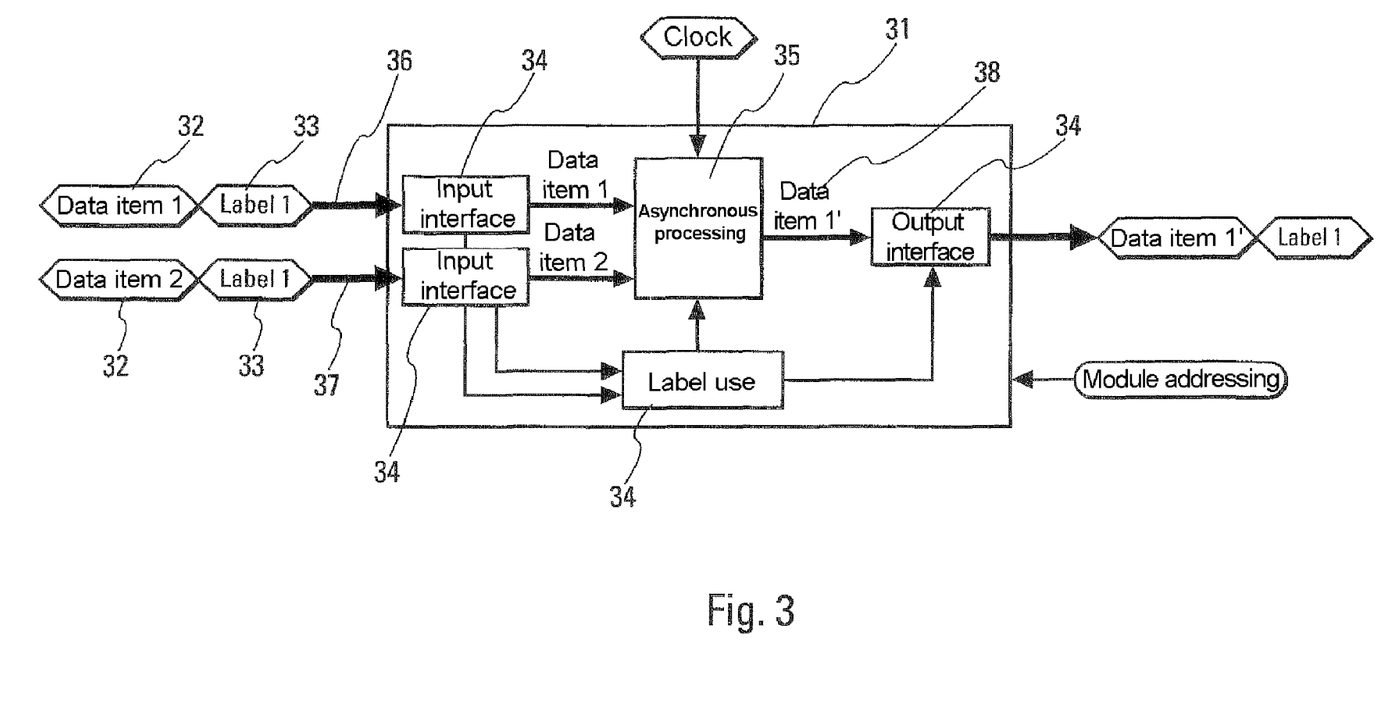
FIG. 3: shows an illustration of the schematic structure of the means included in a processing node implementing asynchronous processing.

Consideration is now given to FIG. 3, which schematically shows the principle for management of the data received by a processing node 31, which performs asynchronous processing 35. This processing is timed by the clock transmitted on the synchronization link 110 by the subassembly 111.

In accordance with the architecture based on the invention, the data received by this processing node are data transmitted by another node using an asynchronous link 19.

According to the invention, all the asynchronous links 19 have an identical structure. These are bidirectional point-to-point links of "full duplex" type, for example used to interchange the data 32 between the processing nodes. Since asynchronous interchanges are involved, the requisite identification of the data 32 transmitted, for an operating phase of the system, is provided by transmitting a header 33, which accompanies the transmitted data item. Thus, the processing node which receives the data item is informed, upon examining the header message 33, of the way in which this data item needs to be processed, without as such having been informed of the moment at which the operating phase under consideration starts.

Taking as an example a radar system, in which the rate of operation is given by the times at which pulse bursts are emitted, a signal processing module will be capable, by virtue of the architecture based on the invention, of asynchronously processing data relating to an emitted burst without as such having to consider the time at which this burst was emitted.

To process a received data item correctly, a processing node performing asynchronous processing comprises means 34 for obtaining, analyzing, storing and restoring this header. These means also allow parameters to be set for the processing performed according to the nature of the data item or of the data items to be processed.

Thus, in the example shown in FIG. 3, the node 31 performs processing on two data streams coming from two distinct processing nodes, for example.

In order to guarantee that the processing performed is applied to data belonging to the same operating phase, the means 34 analyze the respective headers of the two data items which are present on each of the asynchronous links 36 and 37. Conversely, the processing is not performed, for example. Furthermore, in the case in which one of the data items is transmitted ahead of the other, the means 34 can, following analysis of the header, delay the data item transmitted first. To this end, the processing node 31 may have temporary storage means, which are not shown in the figure.

The processing node may also have means (not shown in the figure) for recovering the base clock H from the general synchronization message and thus creating its own clocks from the base clock.

Once the processing has been applied to the received data item, the processing node 31 associates the previously stored header 33 with the processed data item 38 and transmits the data item, preceded by its header, to the next node using a different asynchronous link 19.

According to the invention, the header 33 is a generic message, which contains all the information required for each processing node in the processing chain to be able to determine the way in which it needs to process the data item associated with this header. This message is sent without changing structure from one processing node to the other along the entire processing chain. Thus, at the different stages of its processing, a data item is transmitted from one processing node to another accompanied by a header of single and invariant structure.

The asynchronous processing of the data in association with an asynchronous interchange structure is an essential advantageous feature of the architecture based on the invention. This association makes it possible to limit the influence of the variations in the flow of information processed by the system on the global computation load which the system needs to withstand. In particular, it allows the existence of a variable rate of traffic for the data between the various processing nodes, the general synchronization constraints being borne at the level of the global system and not at the level of each node.

Consideration will now be given to FIG. 4, which schematically shows the principle of management for the data received by a processing node 41 performing synchronous processing 45. This type of processing takes place, by way of example, when analog signals digitized in passing by means of the system's base clock need to undergo a first processing which is dependent on the system's operating phase corresponding to these analog data. Such a case arises in a radar system, for example, particularly at the level of the receiving subassembly. The digitized data stream corresponding to an emitted pulse burst sometimes needs to be processed taking care not to process the N first data items received for each pulse of the emitted burst. Since the number N may vary on the basis of the type of burst emitted, it is important for the first processing node to be able to know the precise moment at which the first data arrive in order to eliminate the N first data items. In such a case, the processing node 41 under consideration comprises synchronous processing 42 allowing it to process the data received in accordance with the sequencing described by the synchronization data item 44 transmitted by the synchronous link. The processing node also comprises asynchronous processing allowing it to find out the parameters relating to the operating phase under consideration. In the case of a radar, the asynchronous data item 45 contains information relating to the emitted burst, for example, and information about the moment at which the data will be available for processing.

Thus, by using the information transmitted by the asynchronous link, the processing node 41 is able to perform synchronous processing in accordance with the generic synchronization message received by the synchronous link. Moreover, the concordance between the data transmitted by the asynchronous link and the corresponding synchronization message is assured by virtue of the simplified header 46 transmitted in the synchronization message. This is because this header, which is part of the header 47 of the asynchronous message corresponding to the same operating phase of the system, for example, allows the messages coming from the two links to be identified and associated correctly.

Figure 4:
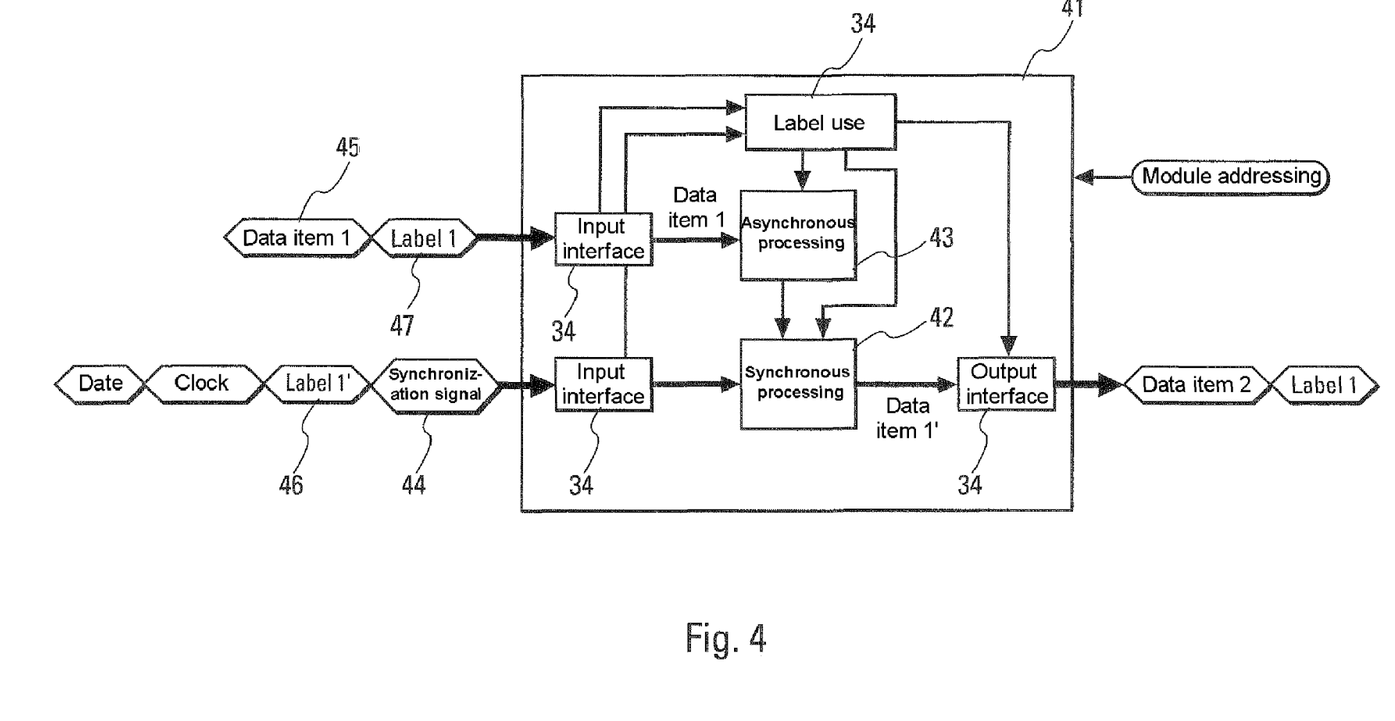
FIG. 4: shows an illustration of the schematic structure of the means included in a processing node implementing synchronous processing.

As can be seen through FIGS. 3 and 4, the synchronization link is advantageously used universally in the system owing to the general message it transports. It can be used simultaneously by a processing node performing synchronous processing and by a processing node performing asynchronous processing, the specific use made of it being determined at the processing node under consideration, which can even take in synchronous and asynchronous processing functions. In that way, the architecture based on the invention allows systems to be designed whose processing nodes are considered as independent elements providing functions entirely autonomously, and each processing node can thus be designed to take charge of its own sequencing. In such an architecture, each processing node is considered to be a simple component of a single machine represented by the system as a whole, with the structure of the internal interchanges in this machine not being dependent on the elements which are set up.

As FIGS. 3 and 4 likewise illustrate, the synchronization link 110 simultaneously distributes to each processing node, a general-use base clock H and a synchronization message used mainly by the processing nodes performing synchronous operations. Thus, each processing node can manage its internal sequencing autonomously, asynchronously, while remaining connected to the general synchronization of the system by one and the same base clock H. however, to forestall the consequences of any damage relating to the reception of this clock by one or more processing nodes (interference, an operating hazard at the reception module of the processing node's synchronization link, etc.), a consequence which could be felt after a delay, owing to the asynchronism in the system's operation, the synchronization link advantageously allows each processing node to check that such damage has not occurred. To this end, the synchronization link distributes to all the processing nodes an additional piece of information representing a continually updated reference date. This reference date changes at the rate of the base clock H. Each processing node can use this date for comparison with a local date which, for its part, changes at the rate of the actually received base clock. Thus, since the two dates have previously been brought into line, for example when the processing node was initialized, the synchronization module can periodically inspect the concordance between the clocks and, if there is a difference, realign the local date and the reference date. According to one possible implementation variant, realigning the local date with the reference date can even be carried out automatically and systematically whenever a new synchronization message is received.

The synchronization link 110 therefore distributes three distinct pieces of information: a base clock H, a synchronization signal and a reference date. This information is also accompanied by a simplified header allowing them to be associated with specific asynchronous data. This information is accessible to all the processing nodes such that even though each processing node generally operates asynchronously, synchronization of the whole of the system continues to be assured.

Figure 5:
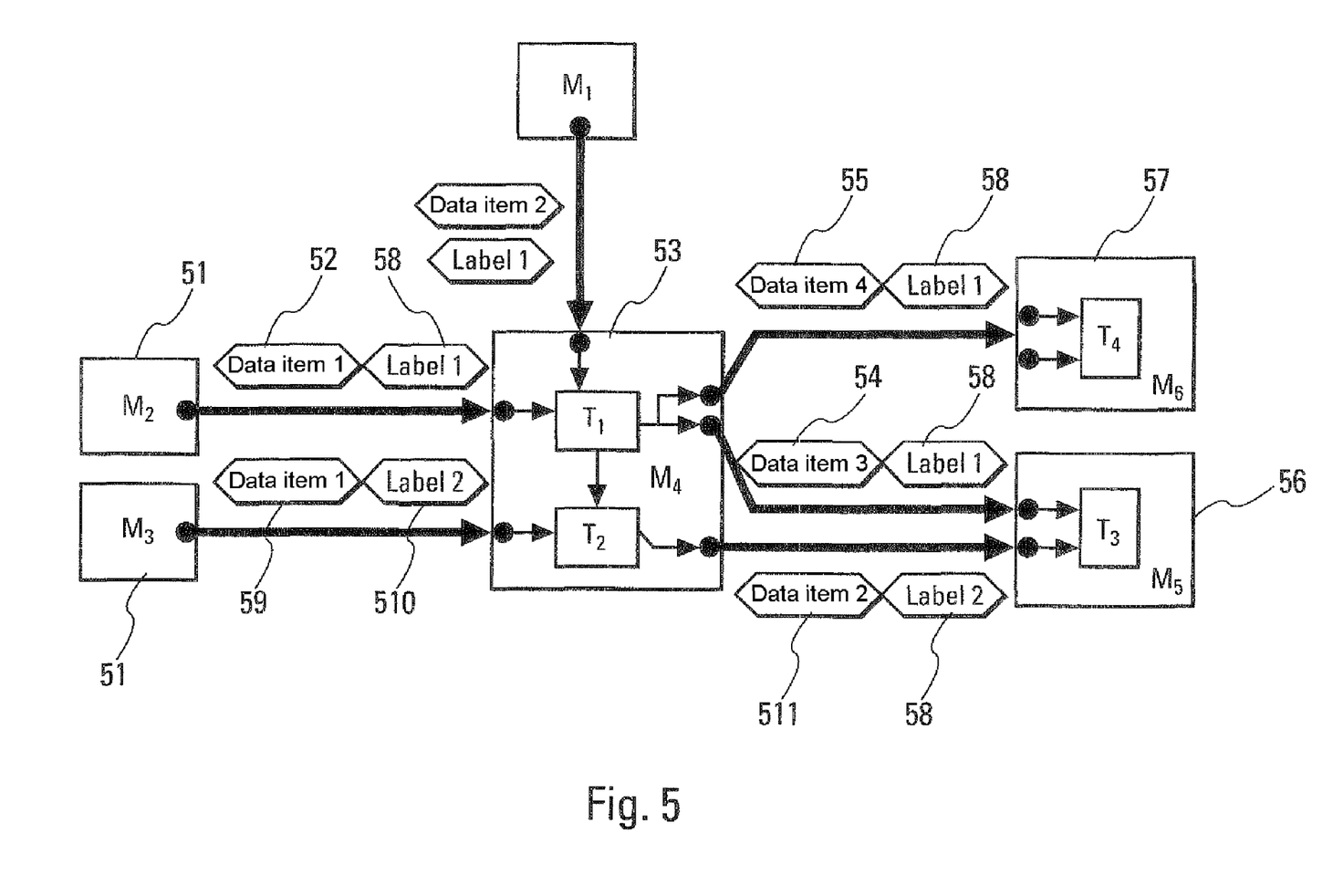
FIG. 5: shows a basic illustration of the data routing implemented in a processing node developed in accordance with the architecture based on the invention.

Our concern now turns to FIG. 5, to explain how the data interchanges are assured on the asynchronous links 19.

On the general basis, in a complex system, one and the same data stream received by the system during a given operating phase undergoes a certain number of transformations as it passes through the various processing nodes which make up the system. Thus, after processing by a processing node 51 ($M_2$ or $M_3$), this data stream can produce a data item 52 (59) which is transmitted to a second processing node 53 ($M_4$), for which it forms an input data item. This data item 52 (59) is processed by $M_4$ and can produce one or more output data items 54, 55 or 511, respectively transmitted to the processing nodes 57 ($M_6$) and 55 ($M_5$).

Thus, in a system of pulse radar type, for example, this data stream is formed by the signal received in response to the emission of a pulse burst emitted in a determined mode. This signal is processed after digitization by the various processing nodes which make up the radar. In such an example, the processing node 51 may be responsible for carrying out adaptive filtering on the signal and for supplying a data item 52 corresponding to the signal after filtering, for example. This data item 52 can then be sent to the processing node 53, whose function is to normalize the data item 52 relative to a calculated average value. The processing node 53 can, for its part, communicate the normalized data item to a processing node 57 and can communicate the calculated average value to another processing node 56.

In the architecture according to the invention, the various processing nodes operate asynchronously with respect to one another. Moreover, the data interchanges are likewise performed asynchronously using the links 19. For a processing node which receives data on an asynchronous link to be able to process this data item appropriately, it is therefore necessary for said data item to be accompanied by an identification message. To this end, according to the invention, the data interchanged across asynchronous links are integrated into a message made up of the data itself with which headers or labels characterizing the data are associated.

In accordance with the architecture based on the invention, as illustrated in FIG. 5, all the data coming from one and the same initial data stream, which are acquired by the system during a given phase of its operation, are associated with one and the same generic header 58 (510), which contains all of the information relating to this operating phase.

According to the invention, each module integrated in the system therefore has means allowing it to identify, from the associated header, the parameterization of the processing function which it will apply to the input data item received by the processing node. The module likewise has means for storing this header so as to associate it with the output data resulting from the processing of the received data item. Each output data item 54, 55 or 511 is associated with the generic header 58, 510 which accompanied the input data item 52, 59 so as to be able to be transmitted to another processing node. Since each output data item is associated with a generic header, it can be transmitted to any recipient processing node so that subsequent processing can be applied to it.

In the case of a radar system as mentioned previously as an example, the header 58 may, by way of example, contain information relating to the emitted pulse burst, such as the size of the pulses, their repetition period and the rank of the pulse under consideration.

In this example, the data item 55 normalized by the processing node 53, which came from the data item 52, is transmitted to the processing node 57 in association with the label 58, while the data item 54 corresponding to the average value calculated by the processing node 53 from the same data item 52 is transmitted to the processing node 56 likewise in association with the label 58.

The architecture according to the invention is thus based on a generic data interchange structure which has the advantage of making it possible to insert a function, implemented by a given processing node, into an existing data processing system. This insertion is made easily by dividing the processing node opening the asynchronous link which transported the data item to which complementary processing needs to be applied and by setting up an asynchronous link between the sending processing node and the processing node providing the inserted function, on the one hand, and an asynchronous link between this processing node and the initially receiving processing node. This insertion operation is advantageously implemented without the need for modification of the initially connected processing nodes.

Figure 6:
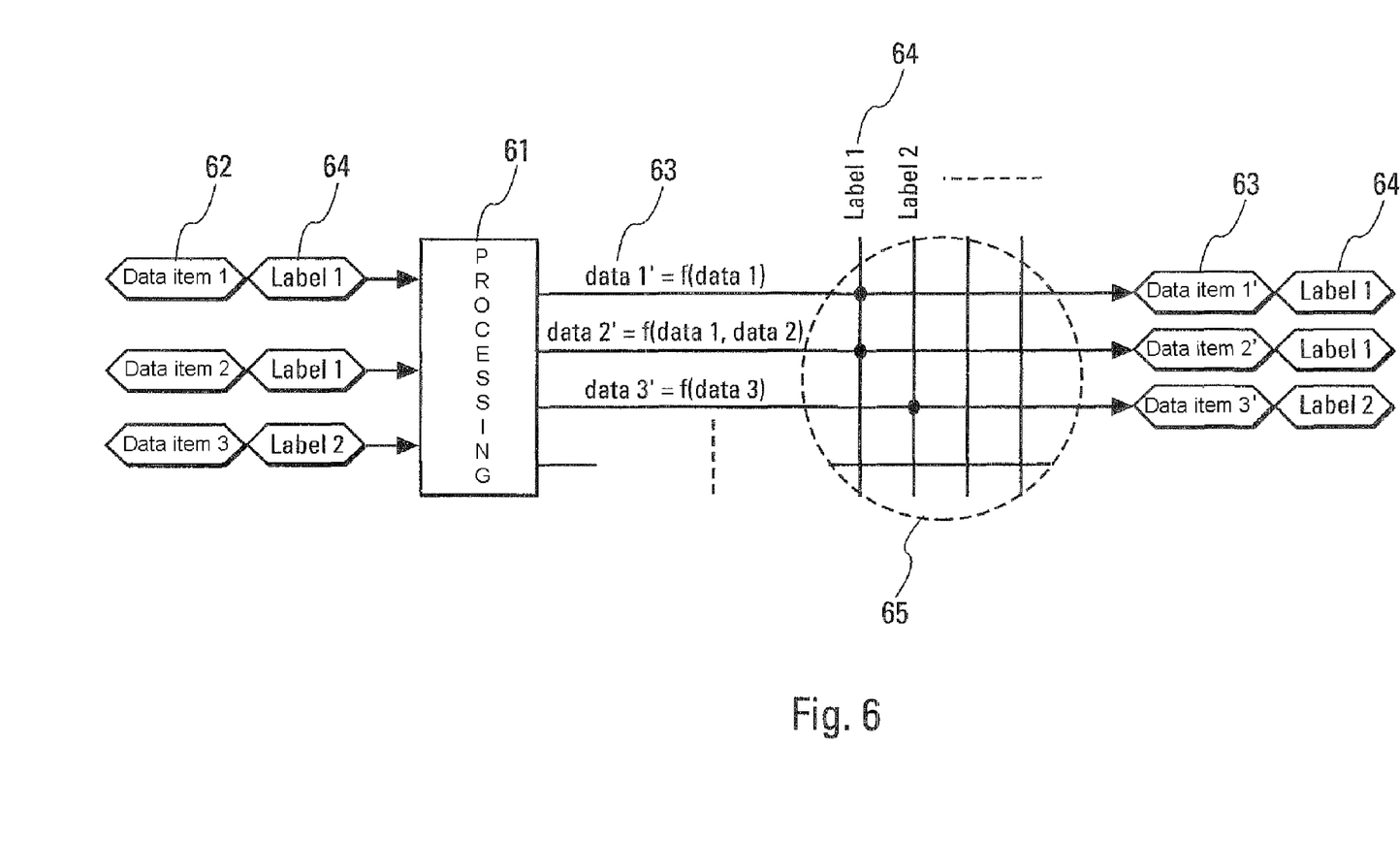
FIG. 6: shows an illustration of an example of data being associated with the appropriate header.

Consideration is now given to FIG. 6. This figure shows the operating principle of the means 34, which are included in a processing node in accordance with the architecture based on the invention, which associate the output data with the appropriate header. These means mainly perform a storage function, not shown in FIG. 6 but shown in FIG. 3, which allows the header accompanying each data item received to be preserved for this data item, and a routing function whose role is to associate with each output data item 63, produced by the processing 61 implemented by the processing node under consideration, the header (label) 64 of the corresponding input data item. The routing function is a specific function of the processing implemented by the processing node under consideration. By way of example, it can be implemented by addressing an association matrix symbolized in the figure by the frame 65. This matrix, which associates one or more output data items 63 with one or more labels 64, is mapped out on the basis of the relationship linking the output data 63 to the input data 62.

The description which follows relates to the nature and the structure of the information transported by the synchronization link. This part of the description will allow a person skilled in the art to obtain an even better appreciation of the advantages of the architecture based on the invention.

Figure 7:
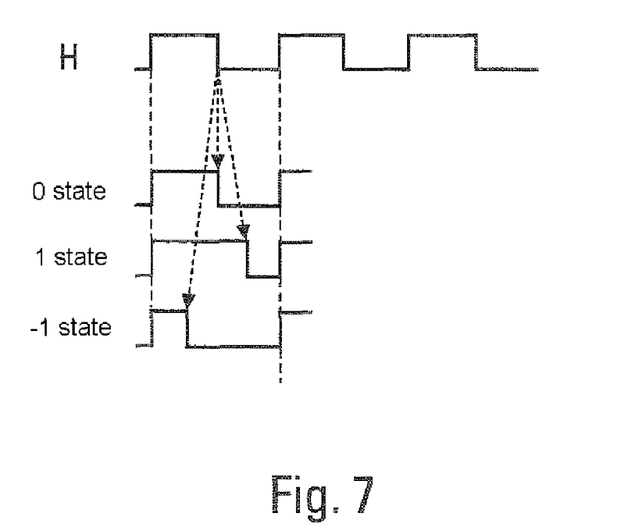
FIG. 7: shows an illustration of the principle of encoding the data bits by modulating the form factor of the timing clock H.
Figure 8:
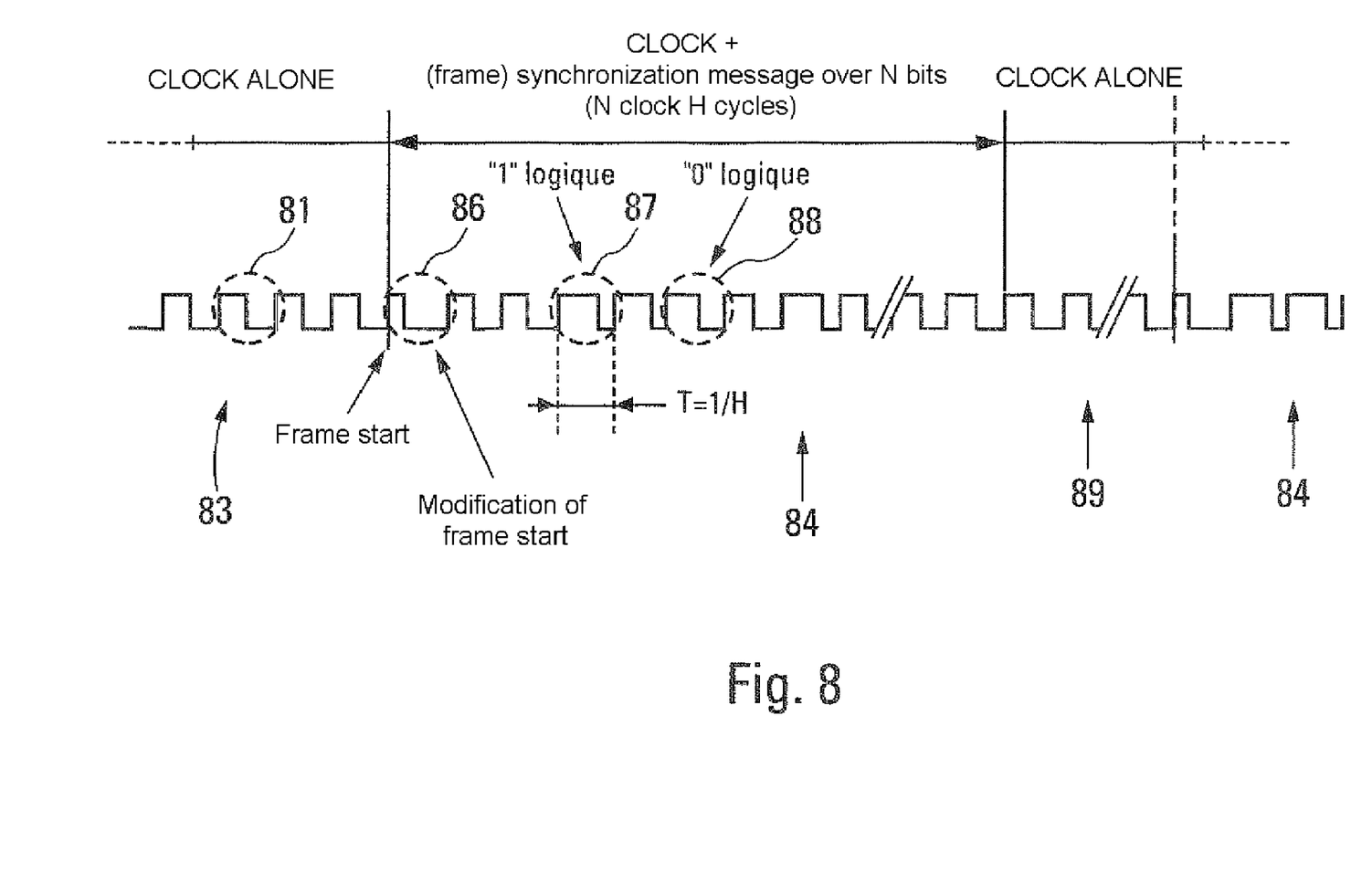
FIG. 8: shows an illustration of the structure of the signals and digital data transmitted on the synchronization link.

Reference is now made to FIGS. 7 and 8, which schematically show the form of the information transmitted and the sequencing of the interchanges which take place on the synchronization link.

From a general point of view, the synchronous link based on the invention is a serial-type link on which binary data frames are sent to each subassembly. A frame has a fixed number of binary data types defining fields, with each field having a given number of bits such that the frame itself has a determined number of bits. The sequencing and the content of the frames sent are moreover formed by the subassembly 111 responsible for the general synchronization. It should moreover be noted that, on the basis of the number of processing nodes that a subassembly comprises, the signal transmitted by the synchronous link is either directly processed at the subassembly or distributed as is to the various processing nodes which form it.

According to the invention, the synchronous data link continually transports a timing clock H of fixed frequency synthesized by the subassembly 111, a clock of frequency F=10 MHz, for example.

This clock H has the feature of being the reference clock for the whole system bearing the architecture based on the invention. This clock H, which is distributed to all the subassemblies by the synchronization link, is the basis for production, within each processing node, of the clocks necessary for operation of the processing nodes which make up the subassembly under consideration. In some cases, these clocks, referred to as slow clocks, are clocks at a lower frequency than the frequency F of the timing clock H, clocks which can be obtained by dividing the frequency F, for example using counters. In other cases, these clocks are clocks at higher frequencies, or even much higher frequencies, than the frequency F, which are obtained by multiplying by the frequency F, using a phase locked loop circuit, for example. According to the invention, the timing clock H is a clock which has the desired stability.

In the specific case of a radar signal processing system, this clock must, by way of example, have sufficient stability to allow the subassemblies responsible for the analog-to-digital conversion of the radar data coming from the receiving subassembly to produce their own sampling clocks whose frequency is a multiple of the frequency F. By way of example, it must likewise be of sufficient precision to allow synthesis of local oscillators operating at intermediate frequencies several tens of times higher than the frequency F. In that way, since the timing clock H is distributed to all the subassemblies by the synchronization link, the processing nodes advantageously benefit from a precise and stable common frequency reference. Furthermore, the implementation of the frequency multiplier circuits required for providing these signals which are multiples of the frequency F is advantageously facilitated by the way in which the form factor of the clock H is modulated, said modulation keeping constant the time interval separating the rising edges of the clock H.

If necessary, the synchronization link also transports various pieces of synchronization information allowing particularly the subassemblies to associate among themselves data whose origin is different subassemblies. This information is encoded in the form of serial binary data.

With the aim of not interrupting the continual transmission of the sequencing clock, the synchronization information is transmitted, according to the invention, by performing specific modulation of the form factor of the clock H. According to the invention, this modulation has three distinct states, as illustrated in FIG. 7. A first state 71 corresponds to a data bit with the value 0, a second state 72 corresponds to a data bit with the value 1, and a third state 73 corresponds to a data bit with the value −1. So as to use the synchronization link to transmit a binary data item equal to 101, for example, it is advisable to modulate the form factor of the clock H over three periods in order to successively transmit a 1 state, a 0 state and then another 1 state. Each data bit thus has a duration equal to T.

In the non-limiting example of FIG. 7, the encoding of a 0 state is obtained by keeping the form factor at ½, the duration of the clock's high state being equal to that of the low state, whereas the encoding of a 1 state is obtained by modifying the form factor such that the duration of the clock's high state is equal to ¾ of the period of H, and the encoding of a −1 state is obtained by modifying the form factor such that the duration of the clock's high state is equal to ¼ of the period of H.

The encoding of the clock H is used to transmit binary data: each bit can therefore take just two states (0 or 1). According to the invention, the third modulation state is used as indicator state, as a synchronization signal. This synchronization signal has two main uses.

First of all, the synchronization signal has the function of signaling the transmission of a data frame on the line. Thus, according to the invention, the transmission of a data frame is always signaled by the transmission of a synchronization bit, or signal. The timing diagram in FIG. 8 describes the various states possible for the synchronization link.

In this figure, it is possible to see the two possible modes of operation, 83 and 84, of the synchronization line. The mode 83 corresponds to the case in which no synchronization information is being transmitted. The clock is thus transmitted only in the form of a periodic signal with a form factor equal to ½. The mode 84, for its part, corresponds to the case in which synchronization information is being transmitted on the synchronization line. In this mode of operation, the form factor of the transmitted clock H is modulated so as to transmit firstly a synchronization signal signaling the start of transmission of a data frame and then to transmit the data bits, of value 1 or 0, which form the frame. The form factor is modulated by modifying the position of the falling edge 85 of the clock pulses under consideration, while keeping the period of the clock H constant such that the time spacing of the rising edges is kept constant and equal to T.

The linking of the modes of operation over the course of time is essentially dependent on the application under consideration. Thus, the synchronization link may operate, by way of example, in a mode 83 during a given lapse of time corresponding to an initialization phase, then in a mode 84 during a lapse of time of undefined duration corresponding to the continual sending of data frames in an operational operating phase, the sending of a frame being able to be separated from neighboring instances of sending, as illustrated in FIG. 8, by short time intervals during which the link operates in the mode 83.

Figure 9:
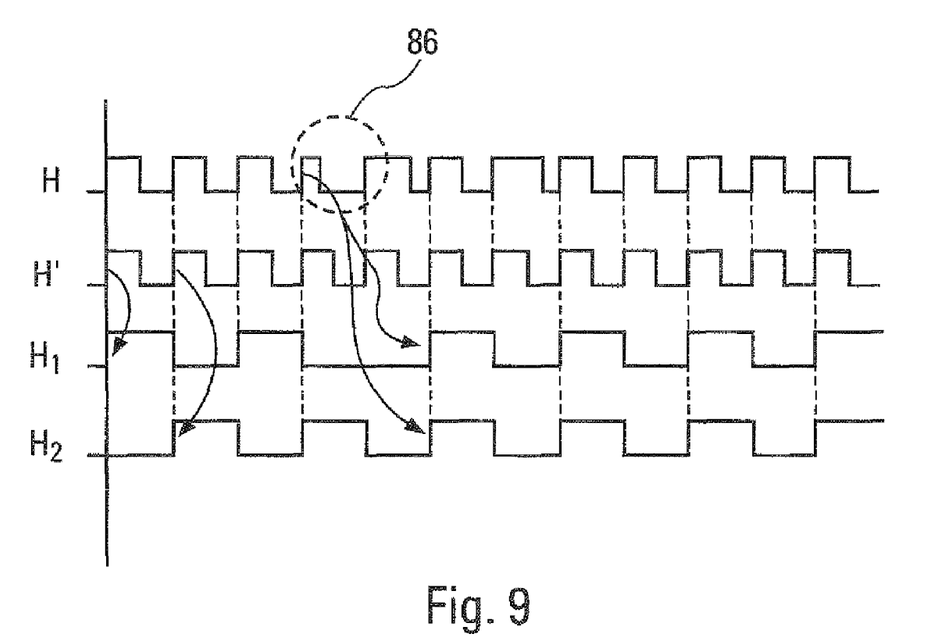
FIG. 9: shows an illustration of the principle of synchronization of the slow clocks of the processing nodes by the synchronization link.

Consideration is now given to FIG. 9.

According to the invention, the synchronization signal likewise has the function of allowing phasing of all the slow clocks, as deduced from the clock H by frequency division (H/2, H/4, . . . ), which are generated by the various subassemblies. The mechanism of this phasing is illustrated by FIG. 9. Its principle consists in detecting, for each subassembly, the appearance of the frame start bit 86 and in synchronizing, if necessary, the rising edge of the clock under consideration with the rising edge of the frame start indicator bit 86. FIG. 9 illustrates the example of two clocks $H_1$ and $H_2$ generated by two different subassemblies, by dividing the frequency of H by 2. This example demonstrates the fact that two clocks of the same frequency which are deduced from H may nevertheless be out of phase. It likewise shows that by simply using the synchronization signal, formed by the bit 86 for signaling the passage of a data frame, each subassembly can, entirely autonomously, phase the slow clocks generated from H. The phasing thus advantageously does not require any specific general procedure. This means that each subassembly can perform phasing of its clocks as soon as its initialization is finished, for example.

In one preferred form of implementation of the synchronization link, the synchronization signal is transmitted periodically as soon as the subassembly 111 responsible for general synchronization of the system and managing this link is in operation, for example after an initialization phase. In this preferred mode of operation, the synchronization signal is transmitted periodically, even if no useful synchronization information is transmitted. In the latter case, a dummy frame is transmitted, one of the bit fields in said frame containing a data item informing the various subassemblies that the data contained in the frame are to be ignored. This means that the synchronization link is the basis for continual transmission of frames which may or may not have any meaning. The synchronization signal is thus advantageously transmitted periodically and frequently. A subassembly's clocks can thus be phased in a very short time. This advantageous feature particularly allows each subassembly, during the general routing for the system, to synchronize its clocks as soon as its initialization and that of the subassembly 111 responsible for the general synchronization are finished, without having to wait for operational synchronization data to move on the link. The subassembly 111 therefore merely has to transmit dummy frames.

This mode of synchronization, advantageously simple in implementation, therefore has the advantage of not requiring any specific synchronization signal.

It also advantageously allows each of the processing nodes of the system to perform its own synchronization independently. This means that when a processing node is forced to perform its own reinitialization, for example as a result of an internal operating problem, it is able, as soon as its reinitialization is finished, to resynchronize its clocks to all of the system clocks without requiring a general resynchronization phase on the part of the system. Likewise, during the system's routing, no specific clock synchronization procedure is required, each processing node synchronizing its own clocks when it has finished its initialization.

As far as the data frames are concerned, it should be noted that these are, as stated previously, made up of a fixed number of bits, the bits which form a frame being grouped into fields, with each field corresponding to a specific piece of synchronization information, encoded over a given number of bits.

The nature and size of the information transmitted vary in practice, largely from one application to the other. However, some information whose interchange is an important feature of the structure based on the invention is necessarily present. Thus, as has likewise been stated previously, a frame based on the invention transports a date reference which is common to all the elements of the system. In particular, this date allows some processed information to be referenced to a more general time reference which is common to several systems interchanging information, for example.

The frame based on the invention likewise transports a simplified header which is part of the header accompanying the corresponding asynchronous data item and which allows a processing node to associate the received synchronization message with a specific asynchronous data item, itself characterized by the header (label) of the message in which it is included.

In the preferred form of implementation, the data frame based on the invention likewise has a data field allowing the subassemblies to find out the nature, be it real or dummy, of the frame under consideration.

Apart from these characteristic data, a frame based on the invention may likewise have a certain number of data fields whose content is used to define, by way of example, the date on which the information which the frame contains needs to be used by the processing nodes. It is thus possible to specify, when a genuinely operational frame is involved, in what amount of time, expressed as number of periods T, after reception of the frame the synchronization information contained will apply.

The table below shows an example, in accordance with the invention, of a data frame structure which can be used in a radar system for the interchanges between the synchronization subassembly 111 and the various processing nodes which make up the system using an architecture based on the invention.

| Data field | Number of bits | Description | |
|---|---|---|---|
| Frame start identifier | 1 | Synchronization bit | 32 bits |
| Synchronization type | 6 | Synchronization type code | |
| Application delay | 8 | Delay to include the synchronization. Value: from 0 to 255 clock H cycles | |
| Reserve | 13 | Available field | |
| Data block identifier | 4 | Identification of the frame type | |
| Data block counter | 16 | Synchronization signal counter Value: from 0 to 65535. | 32 bits |
| Update of the general date | 8 | Data for updating the internal date of the processing nodes on the basis of the general date of the system | |
| Cyclic redundancy test | 8 | Integrity test for the link | |

In the example described here, the data interchanges on the synchronization link are borne by 64-bit frames, the first bit corresponding to the frame start bit, which is likewise used to synchronize the slow clocks.

The frame taken as an example then has a 6-bit field allowing the type of synchronization carried out to be defined. These six bits can thus be used to define whether the frame relates to synchronization at the rate of recurrence, that is to say of the emission of the radar pulses; at the burst rate, that is to say at the rate of a group of pulses for which the received signals are processed coherently; or else at the rate at which the antenna turns and the beam from the antenna travels northwards.

The frame taken as an example also has, in accordance with the invention, a data field revealing the moment at which the data contained in the frame are applied. In this example, the "application delay" field extends over 8 bits, which allows a delay ranging from 0 to 255 clock H cycles to be defined.

This frame also has a data field relating to the type of frame emitted. This 4-bit field makes it possible to define whether an operational frame, a test frame or even a fictitious frame is involved.

It also has an event counter, with 16-bit dynamics, allowing the event under consideration, for example the start of recurrence or bursts, to be attributed/associated with the information contained in the frame.

The frame taken as an example also has, in accordance with the invention, a data field allowing each processing node to synchronize its internal date to the general date. In the example illustrated by the table above, the general date is defined over dynamics of 64 bits which are updated in quartets, starting the update with the quartet which corresponds to the four least significant bits of the counter which is managing the general date. This means that the synchronization data field on the general date has two separate fields, one 4-bit field indicating the rank of the transmitted quartet and another 4-bit field providing the value of the corresponding quartet. In the example, the general date is thus globally updated after transmission of 16 successive frames.

Finally, the frame taken as an example has a data field containing information relating to a cyclic redundancy test, the data item contained allowing each processing node to determine whether the frame received is free of transmission errors, or if not, to attempt to restore the integrity of the information contained in the frame.

In more general fashion, it should be noted that the structure of the information interchanged on the synchronization link advantageously lends itself to implementing means which allow the integrity of the transmitted information to be guaranteed.

Thus, as far as indication of the presence of a frame is concerned, it is possible for the frame to be preceded by the emission of, instead of the simple synchronization signal, a determinate ternary sequence, based on the states 0, 1 and −1, whose recognition allows the synchronization signal to be identified with the minimum of errors. Thus, by way of example, it is possible to form the synchronization signal using a sequence of 7 bits and to implement a ternary corr-elator for recognizing the synchronization signal, with the output of said correlator providing a value equal to 7 at the exact moment at which the sequence corresponding to the synchronization signal passes through.

It is likewise possible, as far as the data frame is concerned, to design said data frame so that the binary data are encoded using a code which detects and corrects errors. The size of the encoded data is thus dependent on the number of errors that it is desired to be able to detect and on the number that it is desired to be able to correct automatically. Thus, by way of example, it is possible to safeguard the integrity of the data transmitted in a 64-bit frame by providing for each 16-bit group of data to be encoded using a code, of Hamming code type with a distance of 4, allowing three simultaneous errors to be detected and two of them to be corrected. The effect of such a code is to extend the size of the frame to 88 bits (i.e. 4 times 16+6 bits).

It will be readily seen by one of ordinary skill in the art that the present invention fulfils all of the objects set forth above.

After reading the foregoing specification, one of ordinary skill in the art will be able to affect various changes, substitutions of equivalents and various aspects of the invention as broadly disclosed herein. It is therefore intended that the protection granted hereon be limited only by the definition contained in the appended claims and equivalent thereof.

The invention claimed is:

1. An electronic system architecture having a plurality of processing nodes, each processing node providing a function or part of a function implemented by the system, comprising:
   one single synchronization link which supplies all the processing nodes with one and the same general synchronization message having a simplified header, a base clock, a synchronization signal and a reference date,
   a plurality of asynchronous data interchange links, each link allowing the interchange of specific data between two specific processing nodes, the interchanged data being accompanied by a generic header including all the information which is used by the various processing nodes and which relates to the system's operating step to which the interchanged data refer,
   each processing node having means suitable for interfacing with the synchronization link and for implementing its internal sequencing on the basis of the base clock and the synchronization message; and
   each processing node having means suitable for processing the headers associated with the input data received by a data interchange link and for associating the appropriate header with the output data produced.

2. The electronic system architecture as claimed in claim 1, according to which each processing node has means suitable for implementing a local date and for periodically comparing this local date with the reference date.

3. The electronic system architecture as claimed in claim 2, in which the synchronization link transmits a timing clock H, a synchronization signal and binary data frames, the synchronization signal and the binary data which make up the frames being transmitted by modulating the form factor of the clock H, with the modulation preserving the time interval which separates the rising edges of the clock H.

4. The electronic system architecture as claimed in claim 1, in which the synchronization link transmits a timing clock H, a synchronization signal and binary data frames, the synchronization signal and the binary data which make up the frames being transmitted by modulating the form factor of the clock H, with the modulation preserving the time interval which separates the rising edges of the clock H.

5. The electronic system architecture as claimed in claim 4, in which the modulation of the form factor of the clock H comprises 3 states:
   a 0 state for which the high state of the clock H has a duration equal to that of the low state, the form factor being equal to ½,
   a 1 state for which the high state of the clock H has a duration greater than that of the low state, the form factor being greater than ½,
   a −1 state for which the high state of the clock H has a duration less than that of the low state, the form factor being less than ½,
the values of the binary data in the frames being encoded on the two states 0 and 1, with the synchronization signal being identified by the −1 code.

6. The electronic system architecture as claimed in claim 5, in which the transmission of a data frame on the synchronization link is signaled by the transmission of a synchronization signal.

7. The electronic system architecture as claimed in claim 5, in which each processing node synchronizes its slow clocks using the synchronization signal.

8. The electronic system architecture as claimed in claim 5, in which the synchronization signal is emitted periodically, accompanied by a data frame containing useful synchronization information or a dummy frame containing meaningless data.

9. The electronic system architecture as claimed in claim 5, in which the synchronization signal is transmitted on the synchronization link in the form of a ternary sequence whose structure is chosen such that the synchronization signal is detected by the subassemblies using a ternary correlator by detecting a correlation peak.

10. The electronic system architecture as claimed in claim 5, in which the information held in the binary frame is subjected to encoding using a code which detects and corrects errors.

11. The electronic system architecture as claimed in claim 4, in which the transmission of a data frame on the synchronization link is signaled by the transmission of a synchronization signal.

12. The electronic system architecture as claimed in claim 11, in which the synchronization signal is emitted periodically, accompanied by a data frame containing useful synchronization information or a dummy frame containing meaningless data.

13. The electronic system architecture as claimed in claim 11, in which the synchronization signal is transmitted on the synchronization link in the form of a ternary sequence whose structure is chosen such that the synchronization signal is detected by the subassemblies using a ternary correlator by detecting a correlation peak.

14. The electronic system architecture as claimed in claim 4, in which each processing node synchronizes its slow clocks using the synchronization signal.

15. The electronic system architecture as claimed in claim 4, in which the synchronization signal is emitted periodically, accompanied by a data frame containing useful synchronization information or a dummy frame containing meaningless data.

16. The electronic system architecture as claimed in claim 15, in which each frame transmitted has a bit field indicating whether this frame is a real frame or whether it is a dummy frame.

17. The electronic system architecture as claimed in claim 4, in which the synchronization signal is transmitted on the synchronization link in the form of a ternary sequence whose structure is chosen such that the synchronization signal is detected by the subassemblies using a ternary correlator by detecting a correlation peak.

18. The electronic system architecture as claimed in claim 4, in which the information held in the binary frame is subjected to encoding using a code which detects and corrects errors.

19. A radar system having a plurality of subassemblies, with each subassembly having a plurality of processing nodes, each processing node providing a function or part of a function implemented by said radar, comprising:

one single synchronization link which supplies all the processing nodes with one and the same general synchronization message having a simplified header, a base clock, a synchronization signal and a reference date, a plurality of data interchange links, each link allowing the interchange of specific data between two specific processing nodes, the interchanged data being accompanied by a generic header including all the information which is used by the various processing nodes and which relates to the burst to which the interchanged data refer;

each processing node having means suitable for interfacing with the synchronization link and for implementing its internal sequencing on the basis of the base clock and the synchronization message; and each processing node having means suitable for processing the headers associated with the input data received by a data interchange link and for associating the appropriate header with the output data produced.

* * * * *